US012338063B1

(12) United States Patent
Pierce

(10) Patent No.: US 12,338,063 B1
(45) Date of Patent: Jun. 24, 2025

(54) STRAP-REINFORCED WASTE BAG SYSTEM

(71) Applicant: Jasmine L. Pierce, Cedar Hill, TX (US)

(72) Inventor: Jasmine L. Pierce, Cedar Hill, TX (US)

( * ) Notice: Subject to any disclaimer, the term of this patent is extended or adjusted under 35 U.S.C. 154(b) by 153 days.

(21) Appl. No.: 18/136,061

(22) Filed: Apr. 18, 2023

Related U.S. Application Data

(63) Continuation-in-part of application No. 17/166,195, filed on Feb. 3, 2021, now Pat. No. 11,628,980.

(60) Provisional application No. 62/969,279, filed on Feb. 3, 2020.

(51) Int. Cl.
*B65F 1/00* (2006.01)

(52) U.S. Cl.
CPC .................................... *B65F 1/002* (2013.01)

(58) Field of Classification Search
CPC ....................................................... B65F 1/002
See application file for complete search history.

(56) References Cited

U.S. PATENT DOCUMENTS 4,799,520 A * 1/1989 Blackburn ........... A47G 33/045 428/15
4,809,353 A * 2/1989 Cheng .................... B65D 33/06 383/14
9,365,327 B2 * 6/2016 Lepoutre ................ A47G 7/063
9,493,299 B2 * 11/2016 Town ................. B65D 88/1681
2009/0236345 A1 * 9/2009 Mack-Robles ......... B65F 1/062 220/495.07
2010/0046861 A1 * 2/2010 Wilcoxen ............... B65D 33/28 493/267
2017/0305662 A1 * 10/2017 Bolos ...................... B65F 1/062

FOREIGN PATENT DOCUMENTS

WO WO-2007081361 A2 * 7/2007 ......... B65D 88/1618

* cited by examiner

*Primary Examiner* — Derek J Battisti
(74) *Attorney, Agent, or Firm* — Richard Eldredge; Leavitt Eldredge Law Firm

(57) ABSTRACT

A strap-reinforced waste bag system incorporates a support strap assembly connected between the drawstrings of the waste bag and a base support connected to the bottom of the bag to transfer lifting force from the drawstrings to the bag bottom, facilitating ease of removal of the waste bad from a waste receptacle when filled.

5 Claims, 7 Drawing Sheets

STRAP-REINFORCED WASTE BAG SYSTEM

BACKGROUND

1. Field of the Invention

The present invention relates generally to waste disposal, and more specifically to a disposable waste bag with supporting straps.

2. Description of Related Art

Waste bags are well known in the art and are effective means to store waste prior to disposal. Waste bags are typically made from thermoplastic materials and formed from two panels and that are sealed to each other along opposing vertical sides. Polymeric trash bags are ubiquitous in modern society, and are available in many varieties, differing in size, thickness, color, and other attributes. There are three typical closure methods for waste bags: straight-top bags with twist-tie closures, bags with flaps protruding from the opening that can be tied to each other to seal the opening, and drawstring waste bags provided with a drawstring contained within a hem. The present invention seeks to improve on the drawstring design.

In recent years, drawstring trash bags have increased in commercial success as consumers opt for the increased utility of the drawstring style waste bag, particularly in domestic households and in kitchen settings.

Drawstring bags typically feature opposed drawstrings located within corresponding hems and anchored to the upper corners of the bag. The drawstrings are used to pull the opening of the bag closed, tied together to secure the closed state of the opening, and can be further used as carrying handles.

Despite the advantages drawstring waste bags provide, shortcomings remain. When a waste bag lining a waste receptacle is full, it can be difficult to pull the bag out of the receptacle due to the walls of the bag swelling outward and sticking to the sides of the receptacle. Typically, a waste bag is gripped around the neck or opening of the bag to remove it from its receptacle, which means all the lifting force is applied at the top of the bag. Attempting to lift waste bag by its neck can result in discomfort such as back pain for some individuals. The present invention improves support around the body of the waste bag to minimize the effort and force required to remove the waste bag from a receptacle.

It is the objective of the present invention to provide an improvement to drawstring waste bags that is more easily removed from a waste receptacle when full and that is economically affordable to manufacture and market. The present invention improves on existing plastic waste bags by including a support base on the bottom of the bag that is connected to the drawstrings by straps. When the drawstrings are pulled upwards, the straps and thus the bottom support are pulled as well. The straps and bottom support concentrate lifting force on the bottom of the bag rather than the top, allowing the filled waste bag to be easily removed from the receptacle.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
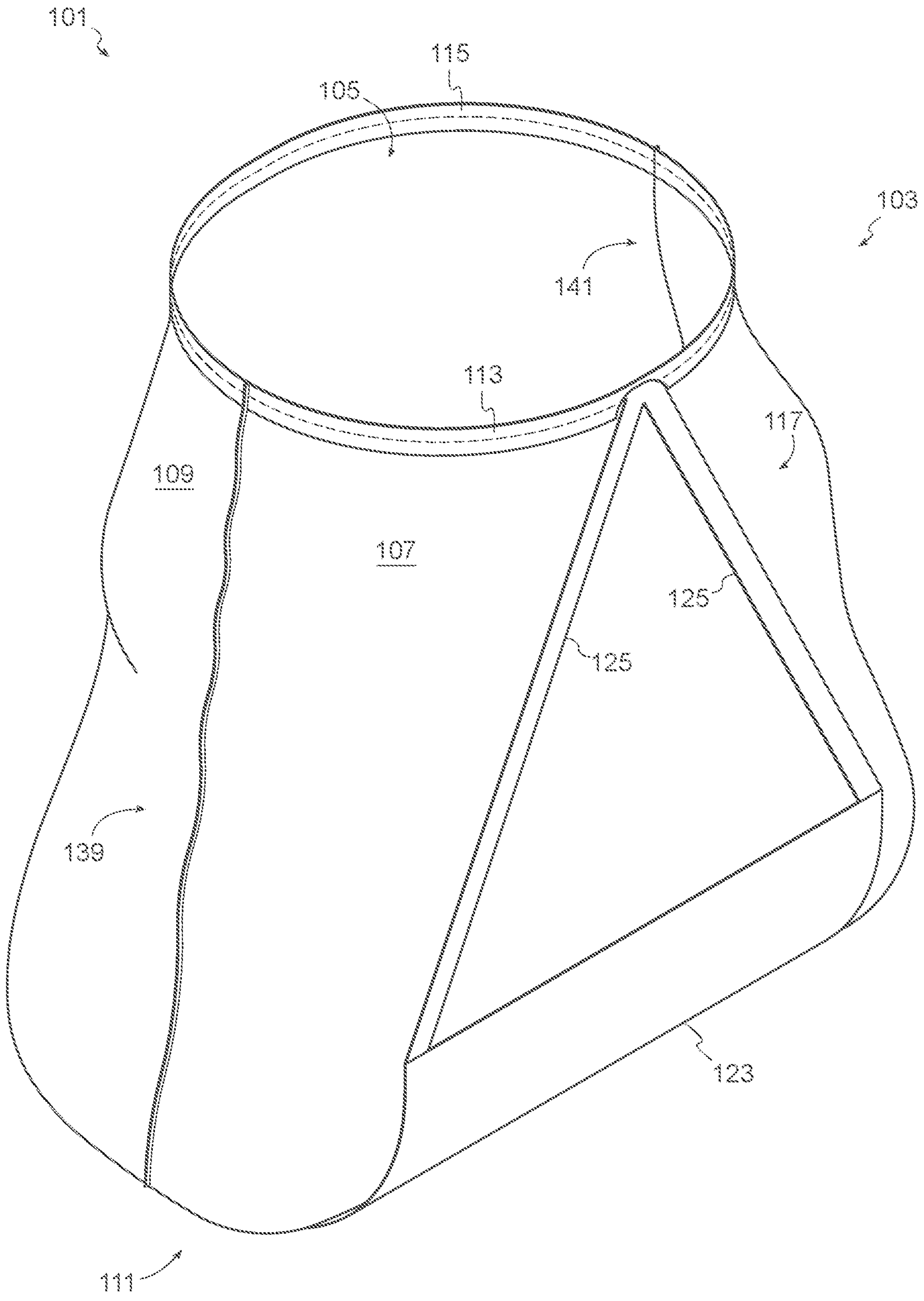
FIG. 1 is a perspective view of an embodiment of the present application.
Figure 2:
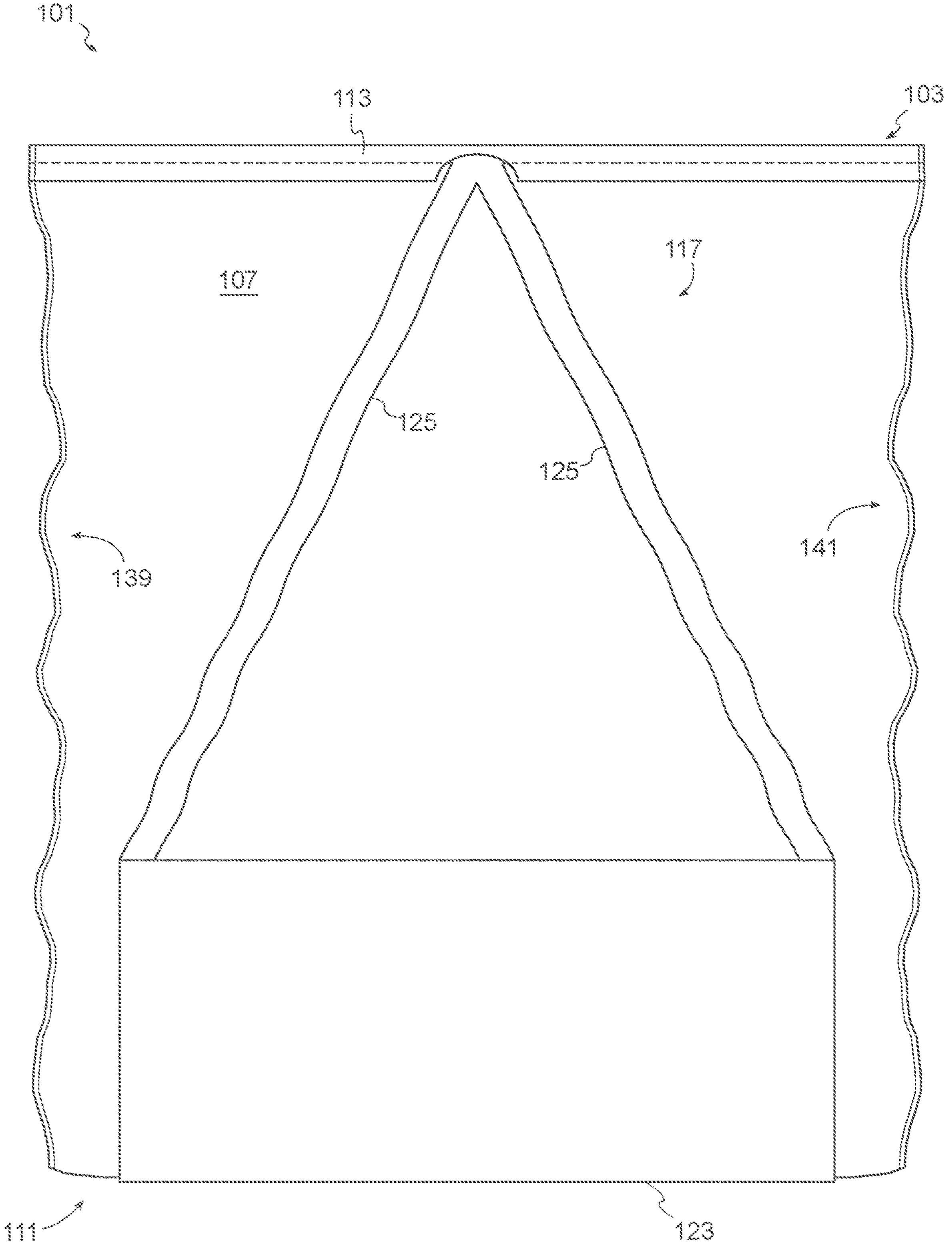
FIG. 2 is a front view of a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional waste bags. Specifically, the system of the present invention includes a base support at the bottom of the bag connected to the drawstrings by straps in order to facilitate ease of removal from a waste receptacle when the bag is full. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

The present invention improves on existing drawstring waste bags by adding an elastic structure and base support to support the waste bag from the sides and bottom. The elastic supporting structure that supports the waste bag incorporates a plurality of what are herein referred to as straps, which should be understood to be strips of any suitable material connecting the drawstrings to the base support at the bottom of the bag. The bag itself may be understood to be constructed from two panels of thin plastic material bonded together along their lateral and bottom edges, leaving an opening at the top.

Referring now to the drawings wherein like reference characters identify corresponding or similar elements throughout the several views, FIGS. 1-4 depict several views in accordance with a preferred embodiment of the present application. It will be appreciated that the present invention overcomes one or more of the above-listed problems commonly associated with conventional waste bags. In addition, it should be appreciated that more or fewer of such components may be included in different embodiments of the waste bag system.

In the contemplated embodiment, system 101 includes a waste bag 103 composed of flexible material, the waste bag 103 having a top opening 105, a first outer side surface 107, a second outer side surface 109, and a bottom 111. The top opening 105 is surrounded at least partially by a first hem 113 and a second hem 115. Alternatively, the top opening 105 may be surrounded at least partially by a single continuous hem. The bottom 111 is integral with the first outer side surface 107 and the second outer side surface 109, positioned opposite the top opening 105.

The system 101 of the present application further includes a support strap assembly 117 having a first drawstring 119 positioned within the first hem 113, a second drawstring 121 positioned within the second hem 115, at least one base support 123 extending underneath the waste bag 103 and being secured to the bottom 111, a first strap set 125 connected between the first drawstring 119 and the at least one base support 123, and a second strap set 127 connected between the second drawstring 121 and the at least one base support 123. It is contemplated and will be appreciated that the attachment of the at least one base support 123 to the first strap set 125 and the second strap set 127 and its extension underneath the waste bag 103 provides for lifting force to be applied to the underside of the trash bag.

It is contemplated that in various embodiments, the at least one base support 123 may take different forms. In some embodiments, the at least one base support 123 is not a single, continuous unit, and may comprise a first base support 129 and a second base support 131. In such embodiments, the first base support 129 is connected to the first outer side surface 107 at the bottom 111, wherein the first strap set 125 is connected between the first drawstring 119 and the first base support 129. Similarly, the second base support 131 is connected to the second outer side surface 109 at the bottom 111, wherein the second strap set 127 is connected between the second drawstring 121 and the second base support 131, and wherein the first base support 129 and the second base support 131 are separate, discontinuous entities from each other.

Figure 3:
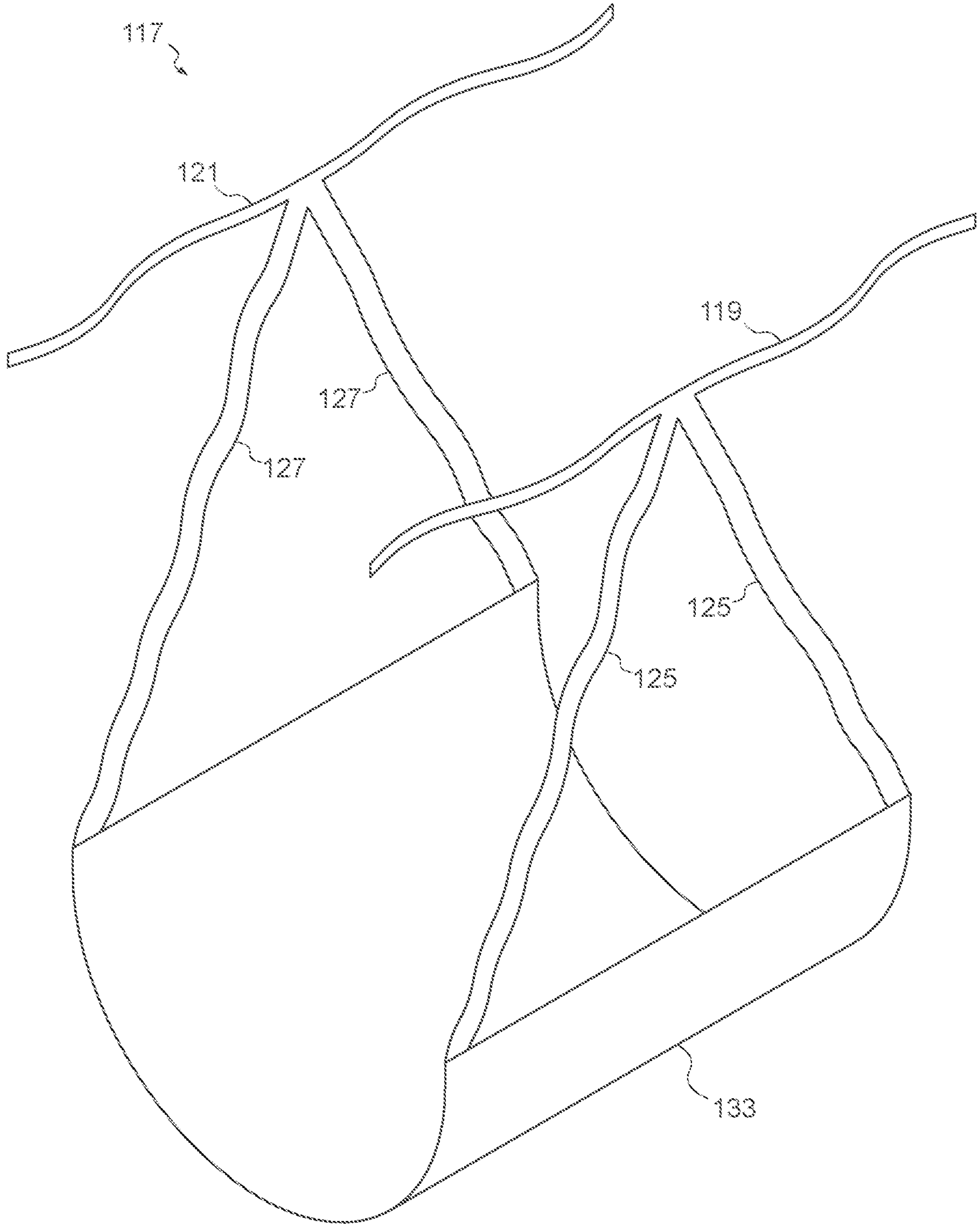
FIG. 3 is a perspective view of an embodiment of the support strap assembly.
Figure 4:
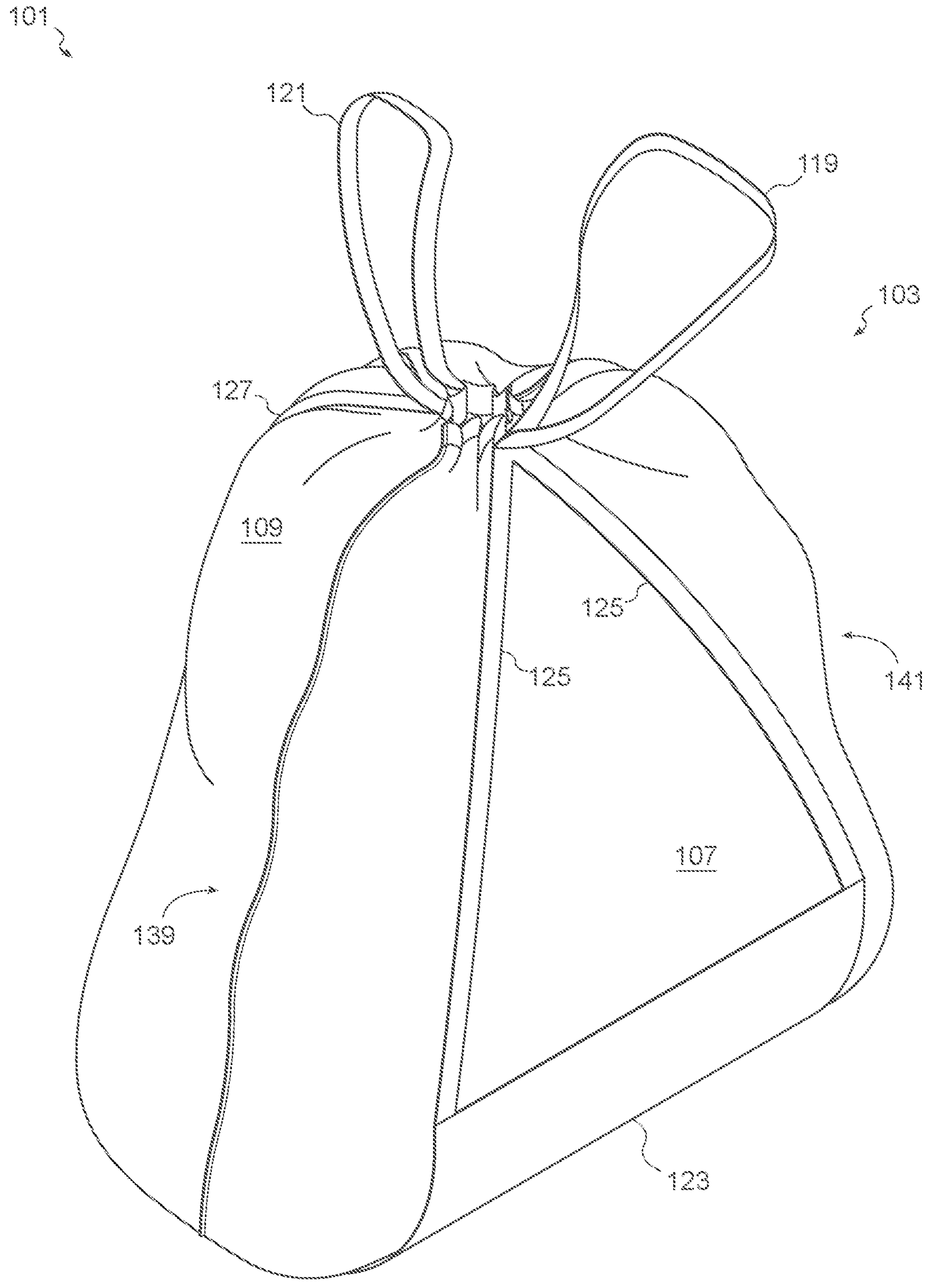
FIG. 4 is a perspective view of an embodiment of the present application in a tied off state.

Alternatively, in some embodiments, the at least one base support 123 may be a monolithic base support 133 connected to the bottom 111, as shown in FIG. 3. In such embodiments, the first strap set 125 may be connected between the first drawstring 119 and the monolithic base support 133 adjacent to the first outer side surface 107, while the second strap set 127 is connected between the first drawstring 119 and the monolithic base support 133 adjacent to the second outer side surface 109, though other configurations for attachment of the strap sets to the base support 123 may be realized in various embodiments without departing from the intended spirit and scope of the present invention. It is further contemplated that any of the proceeding exemplary strap configurations may be incorporated using either the first base support 129 and the second base support 131 as the at least one base support 123 or using the monolithic base support 133 as the at least one base support 123.

The first strap set 125 and the second strap set 127 may each comprise one or more straps in various configurations, as will be discussed hereinafter. Generally, the first strap set 125 and the second strap set 127 are configured such that applying lifting force to the first drawstring 119 and the second drawstring 121 transfers the force to the at least one base support 123 in a symmetrically balanced manner. Each of the first strap set 125 extends from a first end 135 to a second end 137, wherein the first end 135 of the first strap set 125 is attached to the first drawstring 119 and the second end 137 is attached to the at least one base support 123. Similarly, each of the second strap set 127 extends from a first end 135 to a second end 137, wherein the first end 135 of the second strap set 127 is attached to the second drawstring 121 and the second end 137 is attached to the at least one base support 123.

Figure 5:
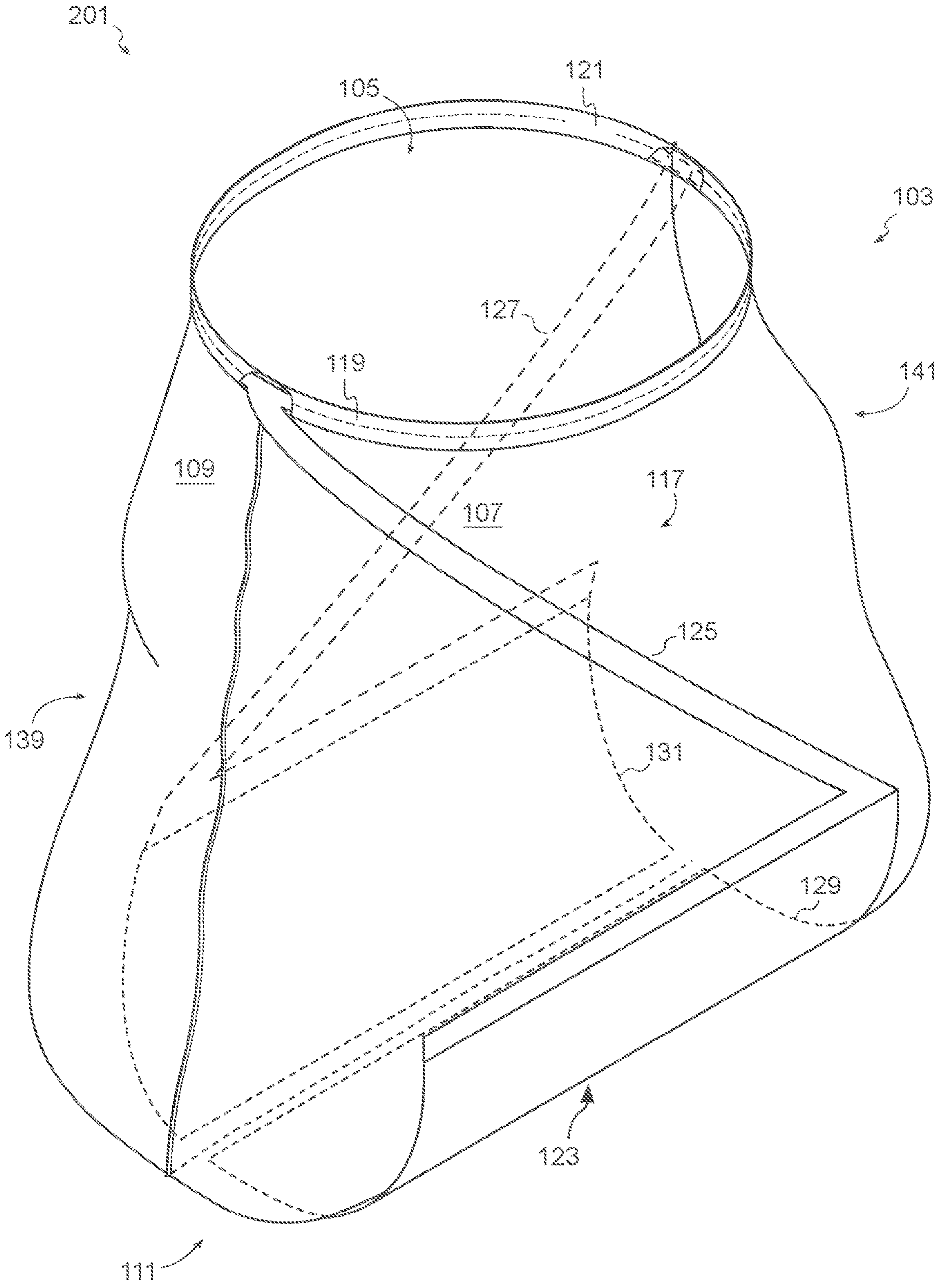
FIG. 5 is a perspective view of a first exemplary embodiment showing an exemplary configuration for the strap assembly.

In a first exemplary embodiment 201 shown in FIG. 5, the first strap set 125 extends diagonally across a width of the first outer side surface 107 from the first drawstring 119 to the at least one base support 123, while the second strap set 127 extends diagonally across a width of the second outer side surface 109 from the second drawstring 121 to the at least one base support 123, angled opposite the first strap set 125. The strap sets are positioned on opposite outer surfaces and are geometrically arranged to each resemble a "Z" shape, while being angularly opposed to each other to maintain the symmetric balance of force transfer from the drawstrings to the at least one base support 123.

Figure 6:
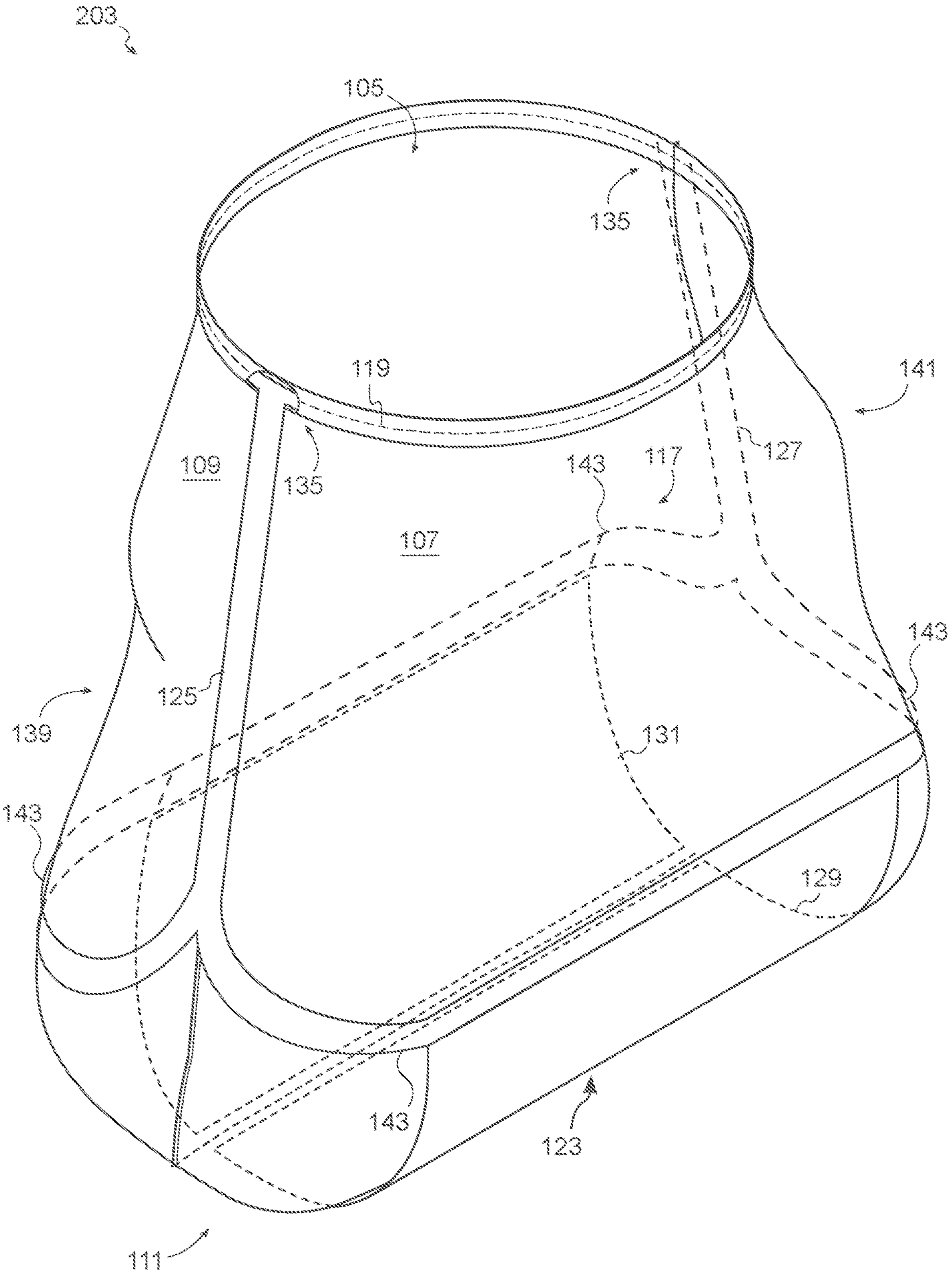
FIG. 6 is a perspective view of a second exemplary embodiment showing another exemplary configuration for the strap assembly.

In a second exemplary embodiment 203 shown in FIG. 6, the first strap set 125 traverses downward along a first lateral side 139 of the waste bag 103, wherein the first end 135 of the first strap set 125 is attached to the first drawstring 119 at the first lateral side 139. Similarly, the second strap set 127 traverses downward along a second lateral side 141 of the waste bag 103 opposite the first lateral side 139, wherein the first end 135 of the second strap set 127 is attached to the second drawstring 121 at the second lateral side 141. Further, the first strap set 125 and the second strap set 127 each diverge into a pair of second ends 143, wherein the pair of second ends 143 of the first strap set 125 is attached to the at least one base support 123 at the first lateral side 139, and wherein the pair of second ends 143 of the second strap set 127 is attached to the at least one base support 123 at the second lateral side 141. Thus, in the second exemplary embodiment 203, the strap sets are configured to resemble an inverted "Y" while being positioned at the lateral sides of the waste bag 103.

Figure 7:
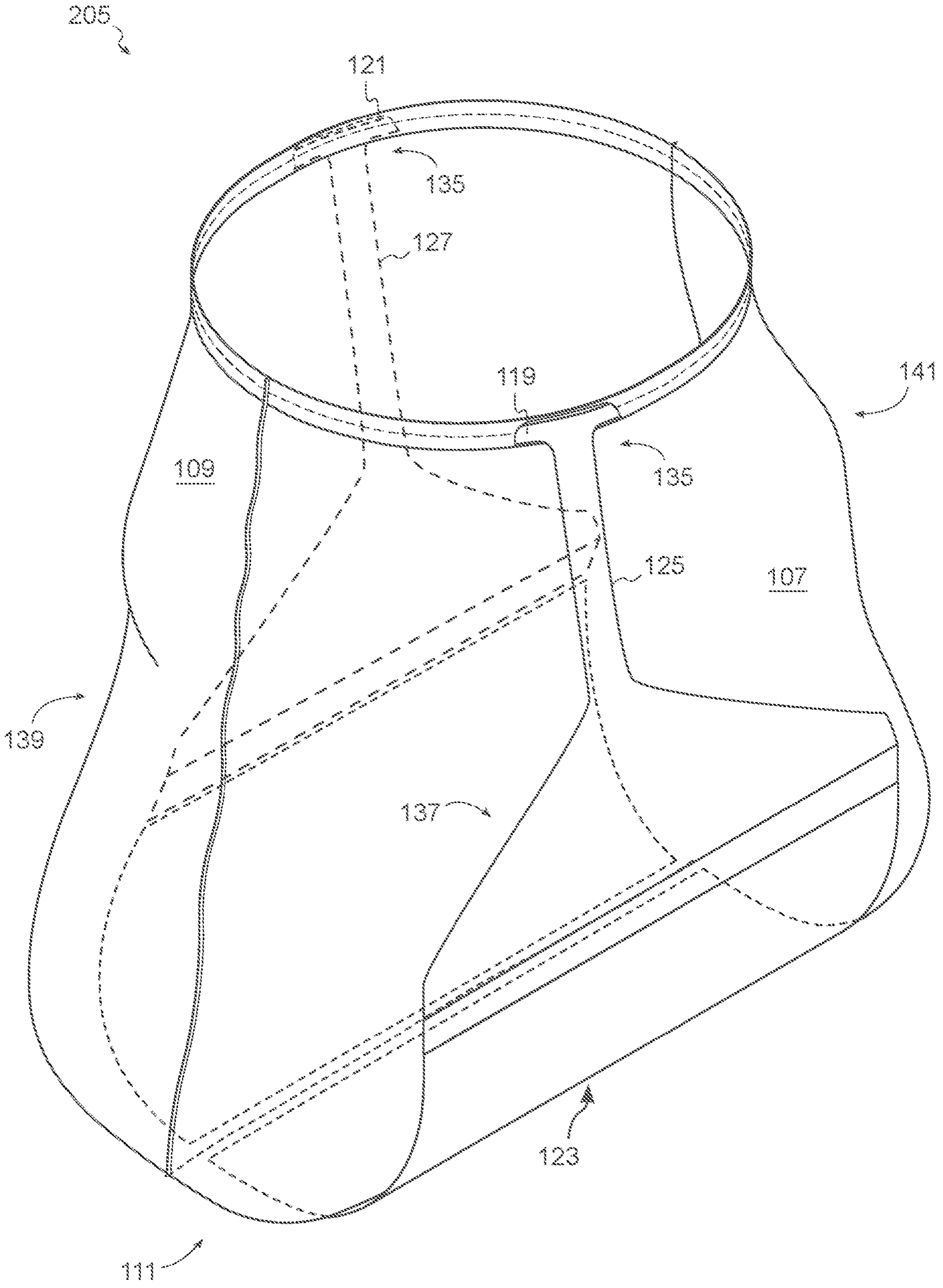
FIG. 7 is a perspective view of a third exemplary embodiment showing another exemplary configuration for the strap assembly.

In a third exemplary embodiment 205 shown in FIG. 7, the first end 135 of the first strap set 125 is attached to the first drawstring 119 at a lateral center of the first outer side 107, while the second end 137 of the first strap set 125 expands to connect along the lateral width of the at least one base support 123 on the first outer side 107.

Similarly, the first end 135 of the second strap set 127 is attached to the second drawstring 121 at a lateral center of the second outer side 109, while the second end 137 of the second strap set 127 expands to connect along the lateral width of the at least one base support 123 on the second outer side 109.

Thus, in the third exemplary embodiment 205, the strap sets are configured to resemble an inverted "Y" shape or an inverted martini glass shape with a wide triangular base and thinner top portion while being positioned on the outer side surfaces of the waste bag 103.

In a fourth exemplary embodiment, the first strap set 125 is positioned on the first outer side surface 107, and the second strap set 127 is positioned on the second outer side surface 109. In this embodiment, the strap sets each comprise two straps, the first ends of which are connected at opposite lateral sides, with the two straps laterally crossing over each other to form an "X" shape.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A strap-reinforced waste bag system comprising:

a waste bag composed of flexible material, the waste bag having:

a top opening surrounded at least partially by a first hem and a second hem;

a first outer side surface and a second outer side surface; and a bottom integral with the first outer side surface and the second outer side surface, positioned opposite the top opening;

a support strap assembly, having:

a first drawstring positioned within the first hem;

a second drawstring positioned within the second hem;

at least one base support extending underneath the waste bag and being secured to the bottom;

a first strap set being connected between the first drawstring and the at least one base support; and a second strap set being connected between the second drawstring and the at least one base support;

each of the first strap set extending from a first end to a second end, wherein the first end is attached to the first drawstring and the second end is attached to the at least one base support;

each of the second strap set extending from a first end to a second end, wherein the first end is attached to the second drawstring and the second end is attached to the at least one base support;

the first strap set traversing downward along a first lateral side of the waste bag, wherein the first end of the first strap set is attached to the first drawstring at the first lateral side;

the second strap set traversing downward along a second lateral side of the waste bag opposite the first lateral side, wherein the first end of the second strap set is attached to the second drawstring at the second lateral side; and the first strap set and the second strap set each diverging into a pair of second ends, wherein the pair of second ends of the first strap set is attached to the at least one base support at the first lateral side, and wherein the pair of second ends of the second strap set is attached to the at least one base support at the second lateral side;

wherein the attachment of the at least one base support to the first strap set and the second strap set and extending underneath the waste bag provides for lifting force to be applied to the underneath of the trash bag.

2. The strap-reinforced waste bag system of claim 1 further comprising:

the at least one base support comprising a first base support and a second base support;

the first base support being connected to the first outer side surface at the bottom, wherein the first strap set is connected between the first drawstring and the first base support; and the second base support being connected to the second outer side surface at the bottom, wherein the second strap set is connected between the second drawstring and the second base support, and wherein the first base support and the second base support are separate from each other.

3. The strap-reinforced waste bag system of claim 1 further comprising:

the at least one base support being a monolithic base support;

the monolithic base support being connected to the bottom;

the first strap set being connected between the first drawstring and the monolithic base support adjacent to the first outer side; and the second strap set being connected between the first drawstring and the monolithic base support adjacent to the second outer side.

4. The strap-reinforced waste bag system of claim 1 further comprising:

the first strap set extending diagonally across a width of the first outer side surface from the first drawstring to the at least one base support; and the second strap set extending diagonally across a width of the second outer side surface from the first drawstring to the at least one base support, angled opposite the first strap set.

5. The strap-reinforced waste bag system of claim 1 further comprising:

the first end of the first strap set being attached to the first drawstring at a lateral center of the first outer side, wherein the first strap set diverges into a pair of second ends, and wherein the pair of second ends of the first strap set is connected to the at least one base support adjacent to a first lateral side and a second lateral side of the first outer side surface; and the first end of the second strap set being attached to the second drawstring at a lateral center of the second outer side, wherein the second strap set diverges into a pair of second ends, and wherein the pair of second ends of the second strap set is connected to the at least one base support adjacent to a first lateral side and a second lateral side of the second outer side surface.

* * * * *